(12) United States Patent
Yamawaki et al.

(10) Patent No.: US 12,539,788 B2
(45) Date of Patent: Feb. 3, 2026

(54) MANAGEMENT DEVICE AND MANAGEMENT METHOD

(71) Applicant: Komatsu Ltd., Tokyo (JP)

(72) Inventors: Shota Yamawaki, Tokyo (JP); Koji Obata, Tokyo (JP)

(73) Assignee: KOMATSU LTD., Tokyo (JP)

( * ) Notice: Subject to any disclaimer, the term of this patent is extended or adjusted under 35 U.S.C. 154(b) by 0 days.

(21) Appl. No.: 18/711,908

(22) PCT Filed: Nov. 25, 2022

(86) PCT No.: PCT/JP2022/043565
§ 371 (c)(1),
(2) Date: May 21, 2024

(87) PCT Pub. No.: WO2023/095878
PCT Pub. Date: Jun. 1, 2023

(65) Prior Publication Data
US 2024/0336158 A1    Oct. 10, 2024

(30) Foreign Application Priority Data

Nov. 25, 2021  (JP) .................... 2021-190921

(51) Int. Cl.
*B60L 58/13* (2019.01)
*B60L 58/40* (2019.01)
*G01C 21/34* (2006.01)

(52) U.S. Cl.
CPC ............ *B60L 58/13* (2019.02); *B60L 58/40* (2019.02); *G01C 21/3469* (2013.01); *B60L 2200/40* (2013.01)

(58) Field of Classification Search
CPC ...... B60L 58/13; B60L 58/40; B60L 2200/40; G01C 21/3469
See application file for complete search history.

(56) References Cited

U.S. PATENT DOCUMENTS

| 10,082,400 | B2* | 9/2018 | Gutruf ................. B60W 10/26 |
| 10,994,719 | B2* | 5/2021 | Obata .................. B60W 20/00 |
| 11,639,113 | B2* | 5/2023 | Gaither ................. B60L 8/003 |
| | | | 701/22 |
| 2009/0012664 | A1* | 1/2009 | Christ .................... B60L 58/40 |
| | | | 903/903 |

(Continued)

FOREIGN PATENT DOCUMENTS

| JP | 2013-228238 A | 11/2013 |
| JP | 2014-108641 A | 6/2014 |

(Continued)

*Primary Examiner* — George C Jin
(74) *Attorney, Agent, or Firm* — Troutman Pepper Locke LLP

(57) ABSTRACT

An electric power amount calculation unit calculates, based on a travel route of a work vehicle at a work site and generated electric power from a fuel cell, a required electric power amount of a battery for traveling on the travel route. An instruction unit instructs, in a case where the remaining capacity of the battery falls below the required electric power amount, the work vehicle to stand by until the remaining capacity of the battery is charged to be equal to or more than the required electric power amount by the generated electric power of the fuel cell.

20 Claims, 7 Drawing Sheets

(56) References Cited

U.S. PATENT DOCUMENTS

| | | | |
|---|---|---|---|
| 2013/0238180 A1* | 9/2013 | Bold | B60W 20/00 |
| | | | 701/22 |
| 2015/0239365 A1* | 8/2015 | Hyde | B60L 58/26 |
| | | | 701/2 |
| 2017/0144673 A1 | 5/2017 | Matsumoto et al. | |
| 2017/0191844 A1* | 7/2017 | Gutruf | G01C 21/3469 |
| 2019/0248243 A1* | 8/2019 | Gaither | B60L 8/003 |
| 2020/0062126 A1 | 2/2020 | Duan et al. | |
| 2020/0320882 A1 | 10/2020 | Fujii et al. | |
| 2024/0037629 A1* | 2/2024 | McClung | G06Q 30/0631 |

FOREIGN PATENT DOCUMENTS

| | | |
|---|---|---|
| JP | 2017-144801 A | 8/2017 |
| JP | 2018-025856 A | 2/2018 |
| WO | 2019/124539 A1 | 6/2019 |

* cited by examiner

MANAGEMENT DEVICE AND MANAGEMENT METHOD

TECHNICAL FIELD

The present disclosure relates to a management device and a management method.

Priority is claimed on Japanese Patent Application No. 2021-190921, filed on Nov. 25, 2021, the content of which is incorporated herein by reference.

BACKGROUND ART

A work vehicle loaded with a fuel cell that uses hydrogen gas as a fuel is being studied. A work vehicle driven by a fuel cell is usually provided with a battery in order to suppress the loaded amount of the fuel cell and to absorb regenerative electric power while traveling downhill. Therefore, a control device of the work vehicle needs to perform energy management for appropriately distributing energy of the fuel cell and the battery.

Patent Document 1 discloses a system that manages a fleet of automatic traveling vehicles that travel in a predetermined area in response to a request from a user while the user rides thereon.

CITATION LIST

Patent Document

[Patent Document 1]
PCT International Publication No. WO2019/124539

SUMMARY OF INVENTION

Technical Problem

As an operation method of a power supply system, a range extender method is known. The range extender method is a method of constantly outputting a certain level of electric power from a fuel cell and covering a difference between electric power required for driving a work vehicle and power output by the fuel cell by charging or discharging a battery. That is, the work vehicle travels using assist electric power from the battery in addition to generated electric power of the fuel cell, for example, during traveling uphill. Therefore, a management device needs to manage the remaining capacity of the battery in addition to the remaining amount of hydrogen gas at the time of allocating a travel route to the work vehicle.

An object of the present disclosure is to provide a management device and a management method capable of managing traveling of a work vehicle provided with a fuel cell and a battery at a work site.

Solution to Problem

A management device according to an aspect of the present disclosure is a management device for a work vehicle provided with a fuel cell and a battery, the management device includes an electric power amount calculation unit configured to calculate, based on a travel route of the work vehicle at a work site and generated electric power from the fuel cell, a required electric power amount of the battery for traveling on the travel route; and an instruction unit configured to instruct, in a case where a remaining capacity of the battery falls below the required electric power amount, the work vehicle to stand by until the remaining capacity of the battery is charged to be equal to or more than the required electric power amount by the generated electric power of the fuel cell.

Advantageous Effects of Invention

According to the above aspect, the management device of the work vehicle can manage traveling of the work vehicle provided with the fuel cell and the battery at the work site.

DESCRIPTION OF EMBODIMENTS

First Embodiment

<<Configuration of Transport System 1>>

Hereinafter, an embodiment will be described in detail with reference to the drawings.

Figure 1:
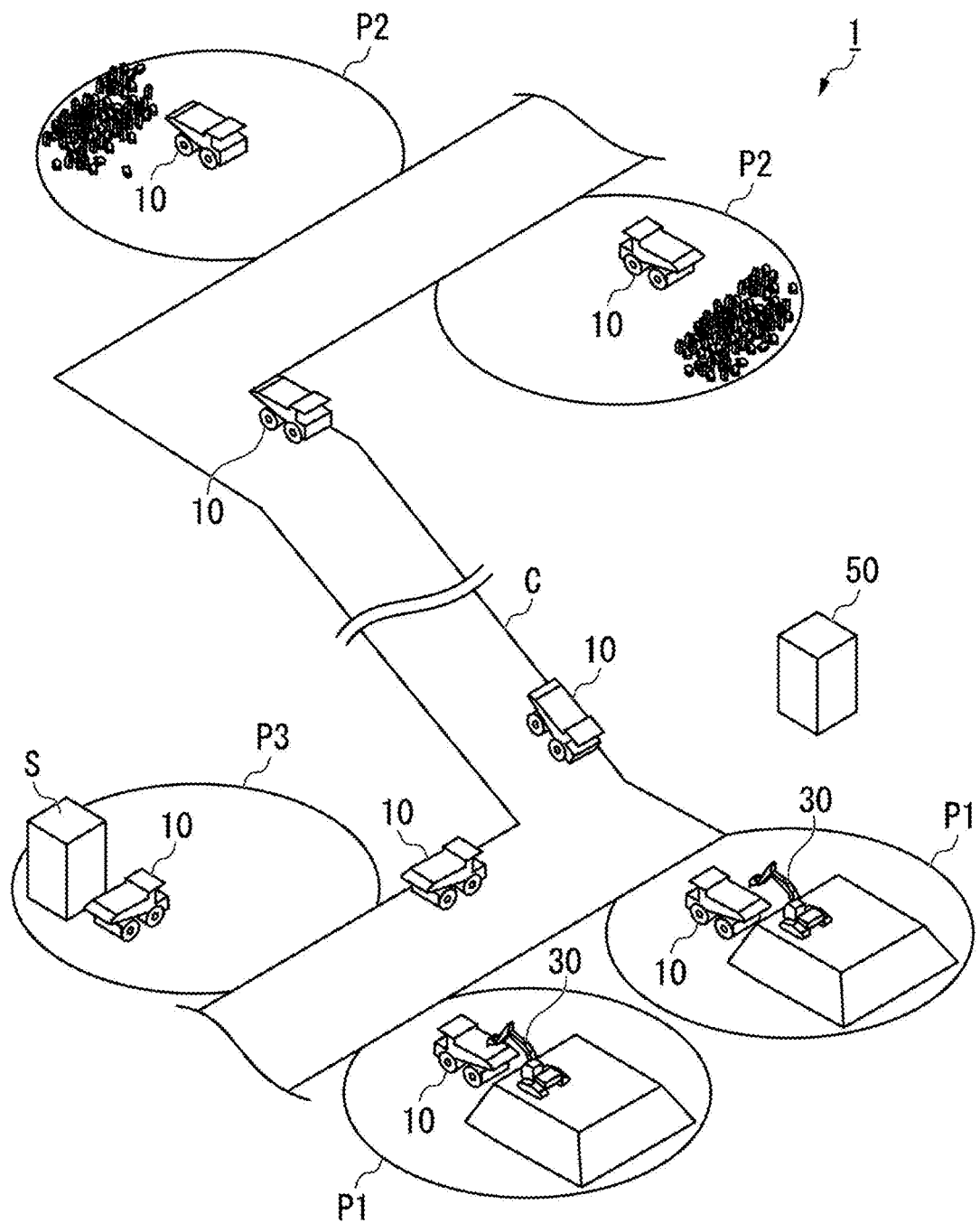
FIG. 1 is a diagram showing the configuration of a transport system provided with a management device according to a first embodiment.

FIG. 1 is a diagram showing the configuration of a transport system 1 provided with a management device 50 according to a first embodiment. The transport system 1 is used to transport mined crushed stone or the like using a plurality of transport vehicles 10. The transport vehicle 10 is driven by a fuel cell using hydrogen gas as a fuel. The management device 50 transmits control data for causing the transport vehicles 10 to travel and controls operations of the transport vehicles 10. The transport vehicle 10 is an example of a work vehicle. As an example of a work site, a mine will be described.

In the mine, a mining field P1, an earth disposal field P2, and a standby field P3 are provided. The transport vehicle 10 is loaded with the crushed stone by a loading machine 30 at the mining field P1, transports the crushed stone to the earth disposal field P2, and discharges the crushed stone at the earth disposal field P2. The loading machine 30 may be, for example, a hydraulic excavator or a wheel loader. When the transport vehicle 10 discharges the crushed stone at the earth disposal field P2, the transport vehicle 10 moves to the mining field P1 again and is loaded with the crushed stone. The standby field P3 is a space for the transport vehicle 10 having a small remaining capacity of a battery 144 to stand by. In addition, a hydrogen station S for replenishing hydrogen gas is provided in the standby field P3. In the hydrogen station S, hydrogen gas is stored at a pressure higher than that in a hydrogen tank 141 provided in the transport vehicle 10, and the hydrogen gas is filled into the hydrogen tank 141 by a pressure difference therebetween. In another embodiment, the hydrogen station S and the standby field P3 may be provided separately. In the mine, a course C on which the transport vehicle 10 travels is provided. The course C may be a road for two-way traffic as shown in FIG. 1 or may be a one-way road.

<<Configuration of Transport Vehicle 10>>

Figure 2:
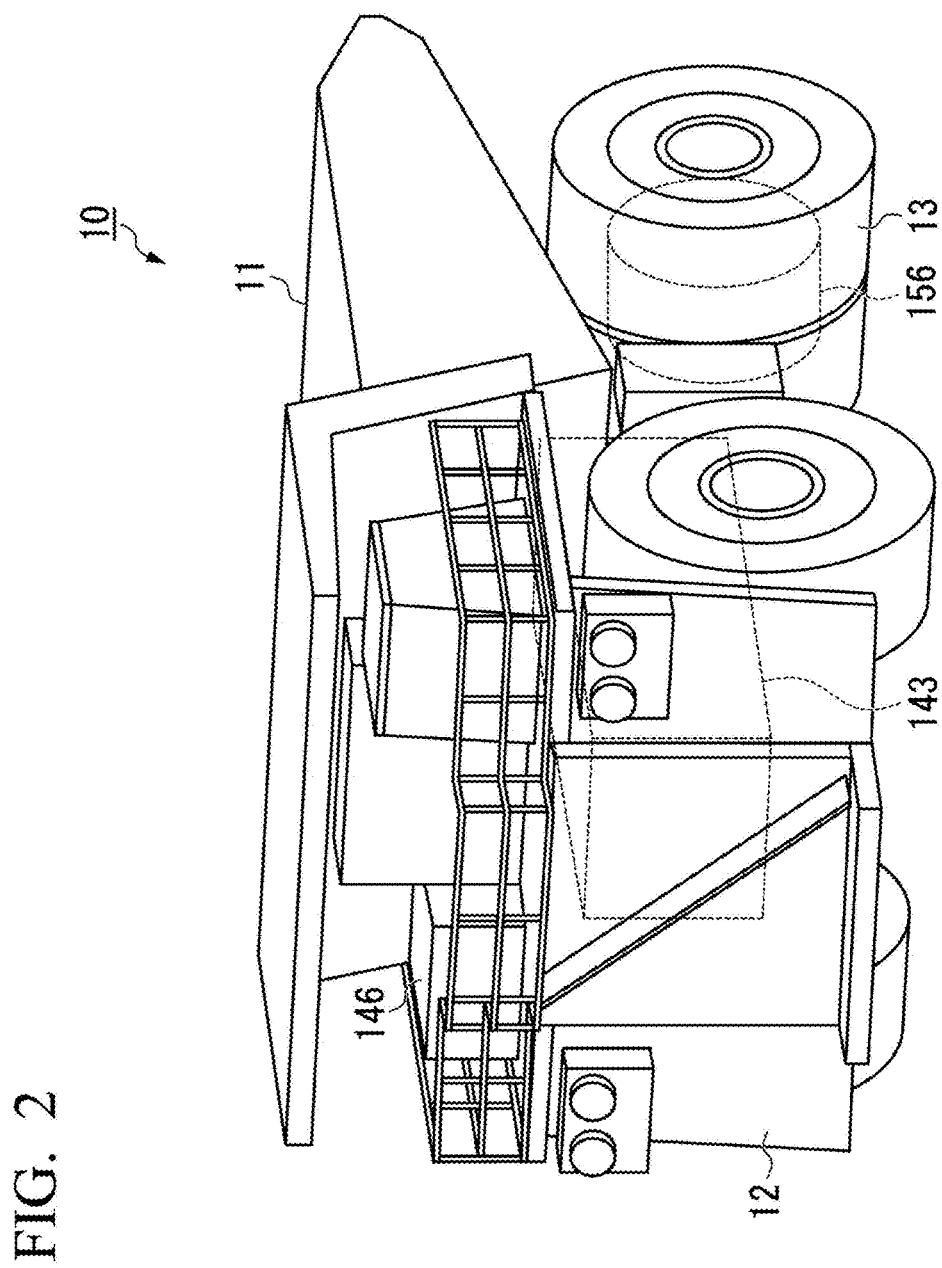
FIG. 2 is a perspective view schematically showing a transport vehicle according to the first embodiment.

FIG. 2 is a perspective view schematically showing the transport vehicle 10 according to the first embodiment. The transport vehicle 10 includes a dump body 11, a vehicle body 12, and a traveling device 13.

The dump body 11 is a member on which a load is loaded. At least a part of the dump body 11 is disposed above the vehicle body 12. The dump body 11 performs a dump operation and a lowering operation. The dump body 11 is adjusted to a dump posture and a loading posture by the dump operation and the lowering operation. The dump posture refers to a posture in which the dump body 11 is elevated. The loading posture refers to a posture in which the dump body 11 is lowered.

The dump operation refers to an operation of separating the dump body 11 from the vehicle body 12 and inclining the dump body 11 in a dump direction. The dump direction is a direction toward the rear of the vehicle body 12. In the embodiment, the dump operation includes elevating a front-end portion of the dump body 11 to incline the dump body 11 toward the rear. In the dump operation, a loading surface of the dump body 11 is inclined downward toward the rear.

The lowering operation refers to an operation of bringing the dump body 11 close to the vehicle body 12. In the embodiment, the lowering operation includes lowering the front-end portion of the dump body 11.

In a case where earth disposal work is executed, the dump body 11 performs the dump operation such that the dump body 11 changes from the loading posture to the dump posture. In a case where a load is loaded on the dump body 11, the load is discharged toward the rear from a rear-end portion of the dump body 11 through the dump operation. In a case where loading work is executed, the dump body 11 is adjusted to the loading posture.

The vehicle body 12 includes a vehicle body frame. The vehicle body 12 supports the dump body 11. The vehicle body 12 is supported by the traveling device 13.

The traveling device 13 supports the vehicle body 12. The traveling device 13 causes the transport vehicle 10 to travel. The traveling device 13 causes the transport vehicle 10 to advance or retreat. At least a part of the traveling device 13 is disposed below the vehicle body 12. The traveling device 13 is provided with a pair of front wheels and a pair of rear wheels. For example, the front wheels are steering wheels, and the rear wheels are driving wheels. It should be noted that combination of steering wheels and driving wheels is not limited to this, and the traveling device 13 may be a four-wheel drive or a four-wheel steering.

Figure 3:
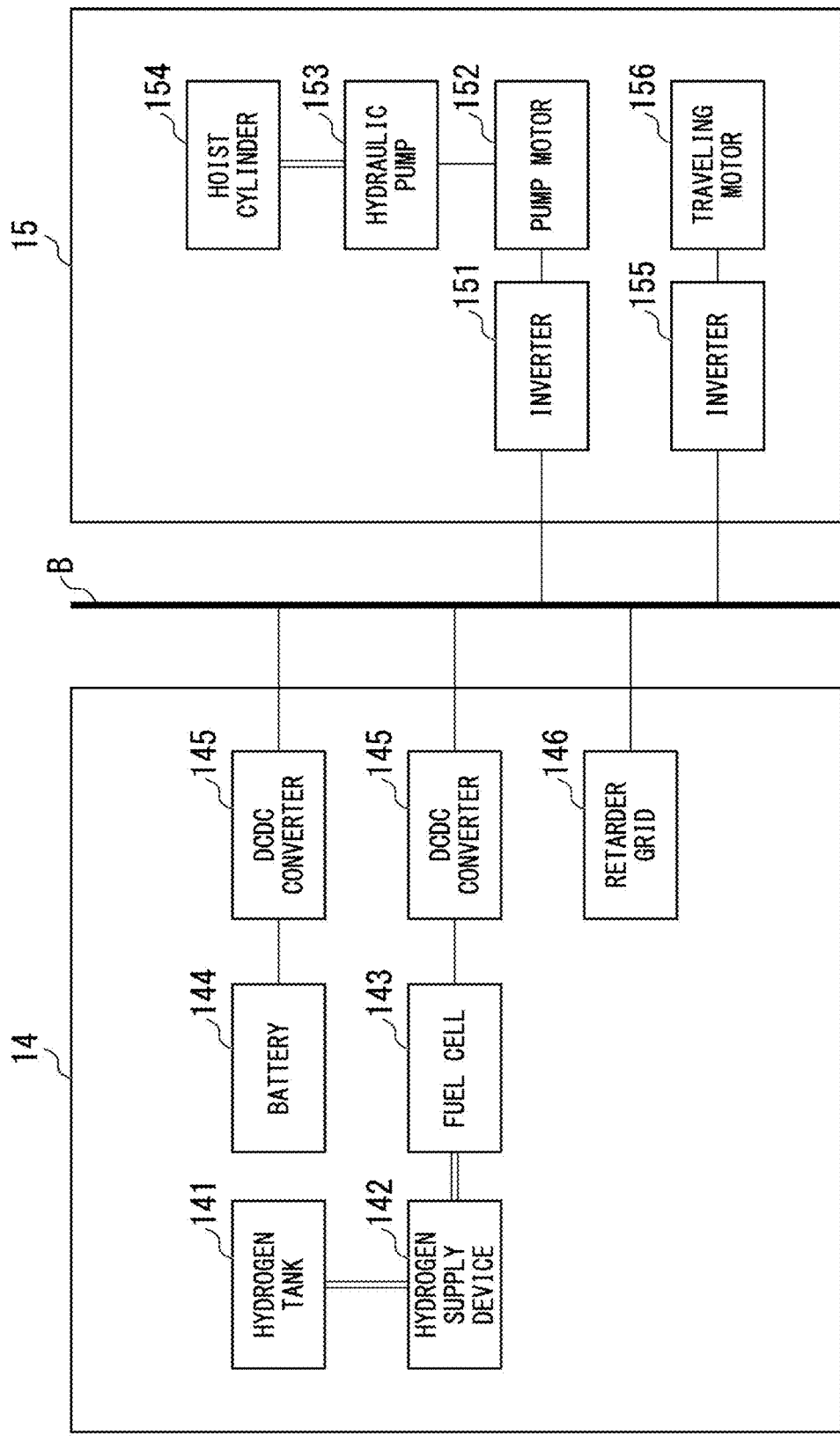
FIG. 3 is a schematic block diagram showing the configuration of a power system and a drive system provided in the transport vehicle according to the first embodiment.

FIG. 3 is a schematic block diagram showing the configuration of a power system 14 and a drive system 15 provided in the transport vehicle 10 according to the first embodiment. The power system 14 includes the hydrogen tank 141, a hydrogen supply device 142, a fuel cell 143, the battery 144, DCDC converters 145, and a retarder grid 146.

The hydrogen supply device 142 supplies the hydrogen gas filled in the hydrogen tank 141 to the fuel cell 143. The fuel cells 143 generate electric power by causing an electrochemical reaction between hydrogen supplied from the hydrogen supply device 142 and oxygen included in outside air. The battery 144 stores the electric power generated by the fuel cells 143. The DCDC converter 145 causes the fuel cell 143 or the battery 144 connected thereto in accordance with an instruction from a control system 16 (refer to FIG. 4) to output electric power. The retarder grid 146 converts regenerative electric power from the drive system 15 into thermal energy in a case where the battery 144 cannot be charged.

The electric power output from the power system 14 is output to the drive system 15 via a bus B. The drive system 15 has an inverter 151, a pump drive motor 152, a hydraulic pump 153, a hoist cylinder 154, an inverter 155, and a traveling drive motor 156. The inverter 151 converts a direct current from the bus B into a three-phase alternating current and supplies the three-phase alternating current to the pump drive motor 152. The pump drive motor 152 drives the hydraulic pump 153. Hydraulic oil discharged from the hydraulic pump 153 is supplied to the hoist cylinder 154 via a control valve (not shown). As the hydraulic oil is supplied to the hoist cylinder 154, the hoist cylinder 154 operates. The hoist cylinder 154 causes the dump body 11 to perform the dump operation or the lowering operation. The inverter 155 converts a direct current from the bus B into a three-phase alternating current and supplies the three-phase alternating current to the traveling drive motor 156. A rotational force generated by the traveling drive motor 156 is transmitted to driving wheels of the traveling device 13.

Figure 4:
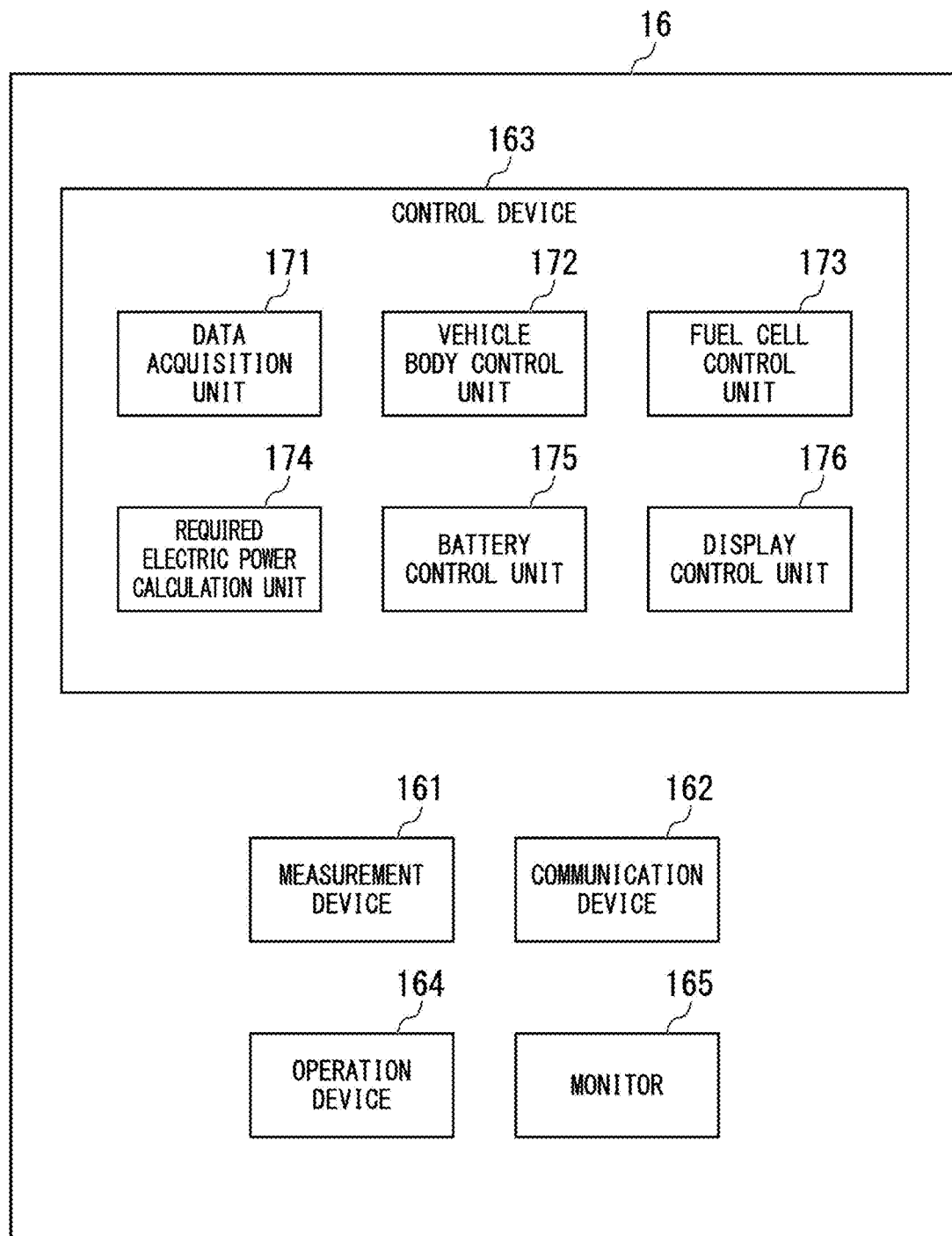
FIG. 4 is a schematic block diagram showing the configuration of a control system provided in the transport vehicle according to the first embodiment.

The transport vehicle 10 includes the control system 16 that controls the power system 14 and the drive system 15. FIG. 4 is a schematic block diagram showing the configuration of the control system 16 provided in the transport vehicle 10 according to the first embodiment. The control system 16 includes a measurement device 161, a communication device 162, a control device 163, an operation device 164, and a monitor 165.

The measurement device 161 collects data related to an operation state and a traveling state of the transport vehicle 10. The measurement device 161 includes at least positioning equipment that determines the position and azimuth direction of the transport vehicle 10 by a global navigation satellite system (GNSS), a speedometer that measures the speed of the transport vehicle 10, a battery level meter that measures the battery level of the battery 144, and a fuel level meter that determines the remaining amount of hydrogen gas.

The communication device 162 performs communication with the management device 50 via a mobile communication network or the like. The communication device 162 transmits measurement data in which various measurement values measured by the measurement device 161 are stored to the management device 50. The communication device 162 receives instruction data for an operator from the management device 50.

The control device 163 drives the transport vehicle 10 in accordance with the operation amount of the operation device 164.

The operation device 164 is provided in a driver's cab and receives an operation performed by the operator. The operation device 164 includes an accelerator pedal, a brake pedal, a steering wheel, a dump lever, and the like.

The monitor 165 is provided in the driver's cab and displays a travel route or the like to the operator.

The control device 163 includes a data acquisition unit 171, a vehicle body control unit 172, a fuel cell control unit 173, a required electric power calculation unit 174, a battery control unit 175, and a display control unit 176.

The data acquisition unit 171 acquires the instruction data from the communication device 162 and acquires the measurement data from the measurement device 161.

The vehicle body control unit 172 generates a control signal for controlling the transport vehicle 10 in accordance with the operation amount of the operation device 164. For example, the vehicle body control unit 172 generates control signals for controlling steering, acceleration, brake, a dump body operation, and the like of the traveling device 13.

The fuel cell control unit 173 controls a supply amount of hydrogen from the hydrogen supply device 142 such that the fuel cell 143 outputs a certain level of electric power set in advance.

The required electric power calculation unit 174 calculates required electric power that is required in the power system 14 based on the control signal generated by the vehicle body control unit 172.

The battery control unit 175 calculates a difference between the generated electric power of the fuel cell 143 and the required electric power. The battery control unit 175 controls the DCDC converter 145 connected to the battery 144 such that the power related to the difference is charged to the battery 144 in a case where the generated electric power is larger than the required electric power, and the power related to the difference is discharged from the battery 144 in a case where the generated electric power is smaller than the required electric power.

The display control unit 176 causes the monitor 165 to display the information included in the instruction data.

<<Configuration of Management Device 50>>

Figure 5:
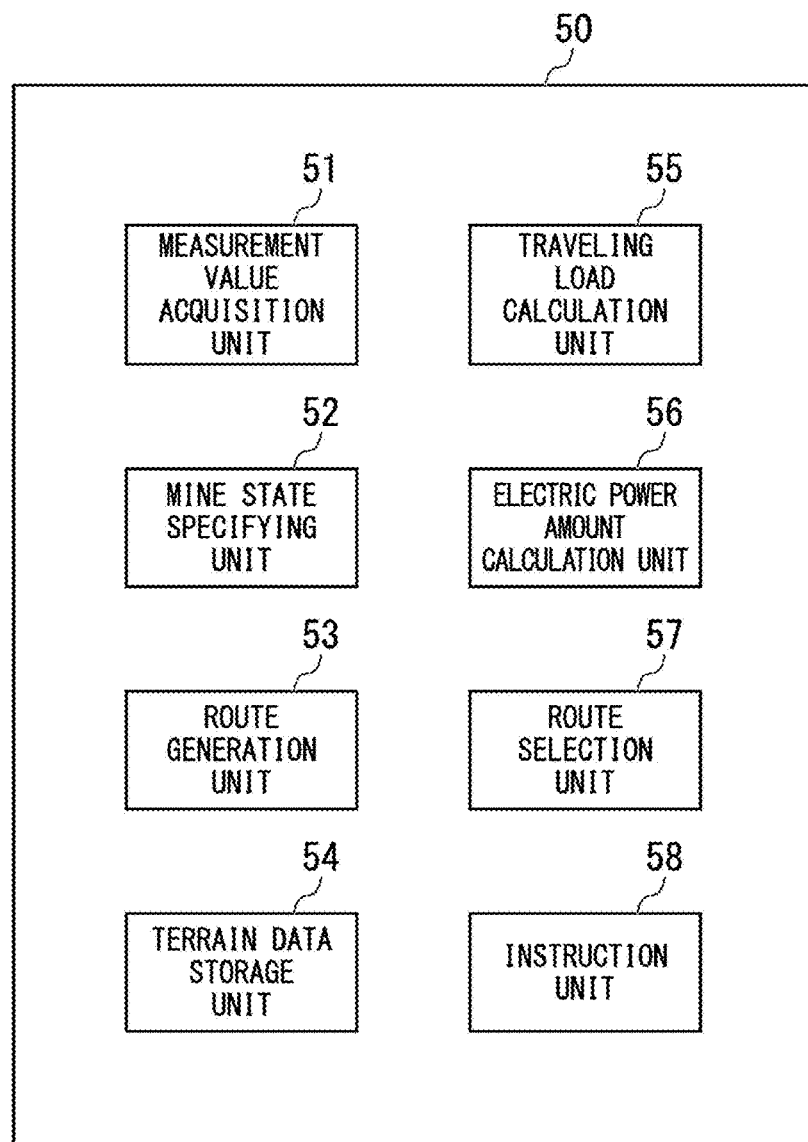
FIG. 5 is a schematic block diagram showing the configuration of the management device according to the first embodiment.

FIG. 5 is a schematic block diagram showing the configuration of the management device 50 according to the first embodiment.

The management device 50 includes a measurement value acquisition unit 51, a mine state specifying unit 52, a route generation unit 53, a terrain data storage unit 54, a traveling load calculation unit 55, an electric power amount calculation unit 56, a route selection unit 57, and an instruction unit 58.

The measurement value acquisition unit 51 receives positions, azimuth directions, and speeds from a plurality of transport vehicles 10.

The mine state specifying unit 52 specifies a crowding state of the mining field P1 and the earth disposal field P2 based on a measurement value acquired by the measurement value acquisition unit 51. For example, the mine state specifying unit 52 specifies the number of the transport vehicles 10 that stand by in the mining field P1 and the earth disposal field P2.

The route generation unit 53 generates a plurality of travel routes through which the transport vehicle 10 with the completed loading work in the mining field P1 moves from the mining field P1 to the next mining field P1 via the earth disposal field P2. The mining field P1 at a starting point and the mining field P1 at an end point of the travel route may be the same as or different from each other. The management device 50 can recognize completion of the loading work, for example, by receiving a signal indicating the completion of the loading from the loading machine 30 to the transport vehicle 10. In addition, the management device 50 can recognize the completion of the loading work, for example, as a loading weight of the dump body 11 of the transport vehicle 10 located in the mining field P1 exceeds a predetermined value and the traveling speed is equal to or more than a predetermined value.

The terrain data storage unit 54 stores terrain data of the mine. Specifically, as the terrain data, a gradient for each position of the course C is stored.

The traveling load calculation unit 55 calculates a time series of traveling loads required for traveling on each of the plurality of travel routes based on the plurality of travel routes generated by the route generation unit 53 and the terrain data stored in the terrain data storage unit 54. The traveling load calculation unit 55 calculates a time series of traveling loads in consideration of a standby time in the mining field P1, the load according to the operation for the dump body 11 in the earth disposal field P2, and the regenerative electric power during traveling downhill. The traveling load is a negative value during power traveling and a positive value during regeneration.

The electric power amount calculation unit 56 calculates a required electric power amount of the battery 144 for traveling on the travel route. Specifically, the electric power amount calculation unit 56 calculates the required electric power amount through the following procedure. First, the electric power amount calculation unit 56 obtains a time series of balances between the traveling load and the generated electric power by adding the generated electric power of the fuel cell 143 to the time series of the traveling loads calculated by the traveling load calculation unit 55. The electric power amount calculation unit 56 obtains a time series of the electric power amounts by integrating the time series of the balances. The electric power amount calculation unit 56 sets a difference between an initial value and a minimum value of the electric power amounts in the time series of the electric power amounts as the required electric power amount of the battery 144 for traveling on the travel route. In a case where the remaining capacity of the battery 144 falls below than the required electric power amount, the remaining capacity of the battery 144 becomes zero during traveling on the travel route. In addition, the electric power amount calculation unit 56 sets a difference between an initial value and a maximum value of the electric power amounts in the time series of the electric power amounts as a spare electric power amount of the battery 144 for absorbing the regenerative electric power. In a case where the remaining capacity of the battery 144 exceeds the spare electric power amount, during traveling on the travel route, the battery level of the battery 144 is maximized, and the regenerative electric power cannot be absorbed by the battery 144. In a case where the regenerative electric power cannot be absorbed by the battery 144, the regenerative electric power can be absorbed by the retarder grid 146. Therefore, there is no problem with the braking of the transport vehicle 10.

The route selection unit 57 selects the travel route on which the transport vehicle 10 is caused to travel, from among the plurality of travel routes generated by the route generation unit 53 based on the measurement value acquired by the measurement value acquisition unit 51, the state of the mine specified by the mine state specifying unit 52, and the required electric power amount and the spare electric power amount calculated by the electric power amount calculation unit 56. The route selection unit 57 is an example of a route determination unit that determines the travel route.

The instruction unit 58 transmits an instruction for the operator of the transport vehicle 10 to the transport vehicle 10. Specifically, in a case where the remaining amount of the hydrogen gas in the transport vehicle 10 falls below a replenishment threshold value, the instruction unit 58 outputs a replenishment instruction to instruct the transport vehicle 10 to replenish the hydrogen gas. The replenishment threshold value is set to, for example, an amount at which the transport vehicle 10 can travel the travel route twice. In addition, in a case where the remaining capacity of the battery 144 of the transport vehicle 10 falls below the required electric power amount for each of the travel routes, the instruction unit 58 outputs an instruction to stand by in the standby field P3 to the transport vehicle 10. Since the fuel cell 143 continues to generate electric power even while the transport vehicle 10 stands by, the remaining capacity of the battery 144 increases during the standby. In a case where the remaining amount of the hydrogen gas is equal to or more than the replenishment threshold value and the remaining capacity of the battery 144 is equal to or more than the required electric power amount for at least one travel route, the instruction unit 58 outputs an instruction to travel on the travel route selected by the route selection unit 57 to the transport vehicle 10.

<<Operation of Management Device 50>>

The measurement value acquisition unit 51 of the management device 50 receives measurement information at any time from the transport vehicle 10, and the mine state specifying unit 52 updates the states of the mining field P1 and the earth disposal field P2.

Figure 6:
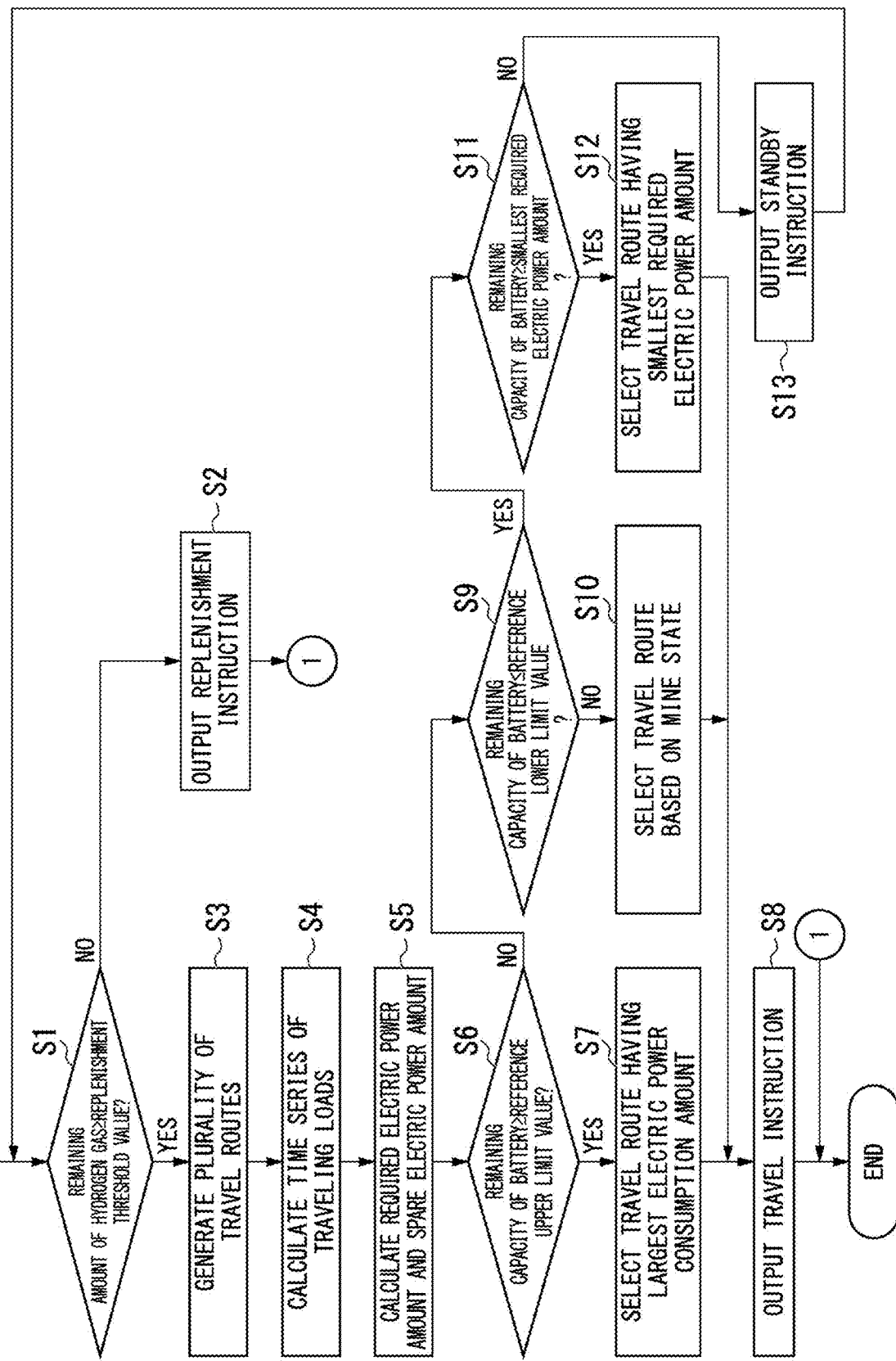
FIG. 6 is a flowchart showing setting processing for control data performed by the management device and the transport vehicle according to the first embodiment.

FIG. 6 is a flowchart showing setting processing of control data performed by the management device 50 and the transport vehicle 10 according to the first embodiment. In a case where the management device 50 detects that the loading work of the transport vehicle 10 is completed, the management device 50 and the transport vehicle 10 execute the setting processing of the control data shown in FIG. 6.

The instruction unit 58 determines whether or not a measurement value of the remaining amount of the hydrogen gas received by the measurement value acquisition unit 51 from the transport vehicle 10 is equal to or more than the replenishment threshold value (step S1). In a case where the measurement value of the remaining amount of the hydrogen gas falls below the replenishment threshold value (step S1: NO), the instruction unit 58 outputs a replenishment instruction of the hydrogen gas to the transport vehicle 10 (step S2). The replenishment instruction may include information indicating a route to the hydrogen station S.

On the other hand, in a case where the measurement value of the remaining amount of the hydrogen gas is equal to or more than the replenishment threshold value (step S1: YES), the route generation unit 53 generates a plurality of travel routes through which the transport vehicle 10 moves from the mining field P1 in which the transport vehicle 10 is present to any mining field P1 via any earth disposal field P2 (step S3). The number of patterns of the travel route is equal to or more than at least the product of the number of the earth disposal fields P2 and the number of the mining fields Pt. Next, the traveling load calculation unit 55 calculates the time series of the traveling loads for each of the plurality of travel routes based on the plurality of travel routes and the terrain data stored in the terrain data storage unit 54 (step S4). The electric power amount calculation unit 56 calculates the required electric power amounts and the spare electric power amounts for the travel routes based on the time series of the traveling loads calculated in step S4 (step S5).

The instruction unit 58 determines whether or not a measurement value of the remaining capacity of the battery 144 received by the measurement value acquisition unit 51 from the transport vehicle 10 is equal to or more than a predetermined reference upper limit value (step S6). The reference upper limit value may be an upper limit value of a predetermined reference range of the remaining capacity of the battery 144. The reference range is, for example, a range determined such that a possibility that regenerative electric power is consumed by the retarder grid 146 or a possibility that the battery 144 is depleted during the power traveling is reduced in a case of traveling on any travel route. In another embodiment, the reference upper limit value may be obtained from a value obtained by subtracting a maximum value of the spare electric power amounts of the plurality of travel routes calculated in step S5 from a maximum capacity of the battery 144, a value obtained by subtracting an average value of the spare electric power amounts+2σ from the maximum capacity of the battery 144, or the like.

In a case where the measurement value of the remaining capacity of the battery 144 is equal to or more than the reference upper limit value (step S6: YES), the route selection unit 57 selects a travel route having a largest electric power consumption amount from among the plurality of travel routes generated in step S3 (step S7). The instruction unit 58 outputs an instruction to travel on the travel route selected in step S7 to the transport vehicle 10 (step S8). The travel instruction includes information indicating the travel route.

In a case where the measurement value of the remaining capacity of the battery 144 falls below the reference upper limit value (step S6: NO), the instruction unit 58 determines whether or not the measurement value of the remaining capacity of the battery 144 is equal to or less than a predetermined reference lower limit value (step S9). The reference lower limit value may be a lower limit value of the predetermined reference range of the remaining capacity of the battery 144. In another embodiment, the reference lower limit value may be obtained from the absolute value of a minimum value of the required electric power amounts for the plurality of travel routes calculated in step S5, the absolute value of a value of the average value—2σ, or the like.

In a case where the measurement value of the remaining capacity of the battery 144 exceeds the reference lower limit value (step S9: NO), the route selection unit 57 selects one travel route from among the plurality of travel routes based on the state specified by the mine state specifying unit 52 (step S10). For example, the route generation unit 53 can allocate a travel route passing through the mining field P1 and the earth disposal field P2 where the number of the transport vehicles 10 that stands by is relatively small, to the transport vehicle 10. The instruction unit 58 outputs an instruction to travel on the travel route selected in step S10 to the transport vehicle 10 (step S8).

In a case where the measurement value of the remaining capacity of the battery 144 is equal to or less than the reference lower limit value (step S9: YES), the route selection unit 57 determines whether or not the measurement value of the remaining capacity of the battery 144 is equal to or more than a smallest required electric power amount among the required electric power amounts calculated in step S5 (step S11). In a case where the measurement value of the remaining capacity of the battery 144 is equal to or more than the smallest required electric power amount (step S11: YES), the route selection unit 57 selects a travel route having the smallest required electric power amount from among the plurality of travel routes (step S12). The instruction unit 58 outputs an instruction to travel on the travel route selected in step S12 to the transport vehicle 10 (step S8).

In a case where the measurement value of the remaining capacity of the battery 144 falls below the smallest required electric power amount (step S11: NO), the instruction unit 58 outputs an instruction to stand by until the remaining capacity of the battery 144 is charged to be equal to or more than the required electric power amount by the generated electric power of the fuel cell 143, to the transport vehicle 10 (step S13). The standby instruction may include information indicating a route to the standby field P3. Thereafter, in a case where the measurement value of the remaining capacity of the battery 144 is equal to or more than the required electric power amount, the processing returns to step S1, and the instruction is output to the transport vehicle 10 again.

Actions and Effects

As described above, the transport system 1 according to the first embodiment instructs the transport vehicle 10 to stand by until the remaining capacity of the battery 144 is charged to be equal to or more than the required electric power amount by the generated electric power of the fuel cell 143 in a case where the remaining capacity of the battery 144 falls below the required electric power amount required for traveling on the travel route. As a result, the battery 144 is charged by the generated electric power of the fuel cell 143 on standby, and the remaining capacity of the battery 144 can be recovered to a level at which it is possible to travel on the travel route. That is, the transport system 1 according to the first embodiment can prevent the battery 144 from being depleted during traveling on the travel route. As a result, the transport system 1 can prevent a decrease in traveling performance of the transport vehicle 10 and improve productivity of the mine. In addition, the transport system 1 can improve a lifetime of the battery 144 by appropriately maintaining the remaining capacity of the battery 144 of the transport vehicle 10.

In addition, in the transport system 1 according to the first embodiment, the travel route is selected based on the mine state in a case where the remaining capacity of the battery 144 is equal to or more than the reference lower limit value and equal to or less than the reference upper limit value. As a result, the transport vehicle 10 having a low possibility that the battery 144 is depleted even in a case where any travel route is selected and having a low possibility that the regenerative electric power is consumed by the retarder grid 146 is caused to travel on the travel route selected based on the mine state, so that efficiency of the mine can be improved while preventing a decrease in efficiency of the transport vehicle 10. In another embodiment, the transport system 1 may select the travel route based on the mine state in a case where the remaining capacity of the battery 144 is equal to or more than the reference lower limit value, regardless of the reference upper limit value. In addition, in another embodiment, the transport system 1 may select the travel route based on the mine state in a case where the remaining capacity of the battery 144 is equal to or less than the reference upper limit value, regardless of the reference lower limit value. In addition, the transport system 1 according to another embodiment may select the travel route using another method, regardless of the mine state.

In addition, the transport system 1 according to the first embodiment selects the travel route having the largest electric power consumption amount in a case where the remaining capacity of the battery 144 is equal to or more than the reference upper limit value. As a result, the transport system 1 can cause the transport vehicle 10 having the excessive remaining capacity of the battery 144 to travel on the travel route with a high load, and can cause the electric power of the battery 144 to be consumed. It should be noted that, in another embodiment, the transport system 1 need not always select the travel route having the largest electric power consumption amount. For example, a travel route may be selected based on the mine state from among a plurality of travel routes having large electric power consumption amounts, including the travel route having the largest electric power consumption amount.

In addition, the transport system 1 according to the first embodiment instructs the work vehicle to replenish the hydrogen gas in a case where the remaining amount of the hydrogen gas loaded on the transport vehicle 10 falls below the replenishment threshold value. As a result, the transport system 1 can prevent the hydrogen gas from being depleted during traveling on the travel route.

Other Embodiments

Although one embodiment has been described in detail above with reference to the drawings, the specific configuration is not limited to the above-described one, and various design changes and the like can be made. That is, in another embodiment, the order of the above-described processing may be appropriately changed. In addition, some of the processing may be executed in parallel.

Each of the management device 50 and the control device 163 according to the above-described embodiment may be configured of a single computer, or the configuration of the management device 50 or the control device 163 may be divided into a plurality of computers and be deployed, so that the plurality of computers cooperate with each other to function as the management device 50 or the control device 163. In this case, some computers configuring the control device 163 may be mounted inside the transport vehicle 10, and the other computers may be provided outside the transport vehicle 10.

The transport vehicle 10 according to the above-described embodiment is a manned vehicle operated by the operator, but the present disclosure is not limited to this. For example, the transport vehicle 10 according to another embodiment may be an unmanned vehicle that automatically travels. In this case, the control system 16 of the transport vehicle 10 may not be provided with the operation device 164 and the monitor 165. In addition, the vehicle body control unit 172 needs to only generate the control signal through PTD control or the like based on the travel route and the measurement value of the measurement device 161.

In addition, in the above-described embodiment, the transport vehicle 10 is described as the work vehicle, but the present disclosure is not limited to this. For example, in another embodiment, the management device 50 may manage other work vehicles, such as a hydraulic excavator, a wheel loader, and a dump truck.

The management device 50 according to the above-described embodiment generates the plurality of travel routes and selects one travel route from among the plurality of travel routes, but the present disclosure is not limited to this. For example, the management device 50 according to another embodiment may generate only one travel route and may determine whether to cause the transport vehicle 10 to travel on the travel route or to stand by based on the remaining capacity of the battery 144.

The management device 50 according to the above-described embodiment selects the travel route on which the transport vehicle 10 is caused to travel from among the plurality of travel routes generated by the route generation unit 53, but the present disclosure is not limited to this. For example, in another embodiment, the management device 50 may search for and determine a travel route based on the measurement value acquired by the measurement value acquisition unit 51, the mine state specified by the mine state specifying unit 52, and the required electric power amount and the spare electric power amount calculated by the electric power amount calculation unit 56.

<Configuration of Computer>

Figure 7:
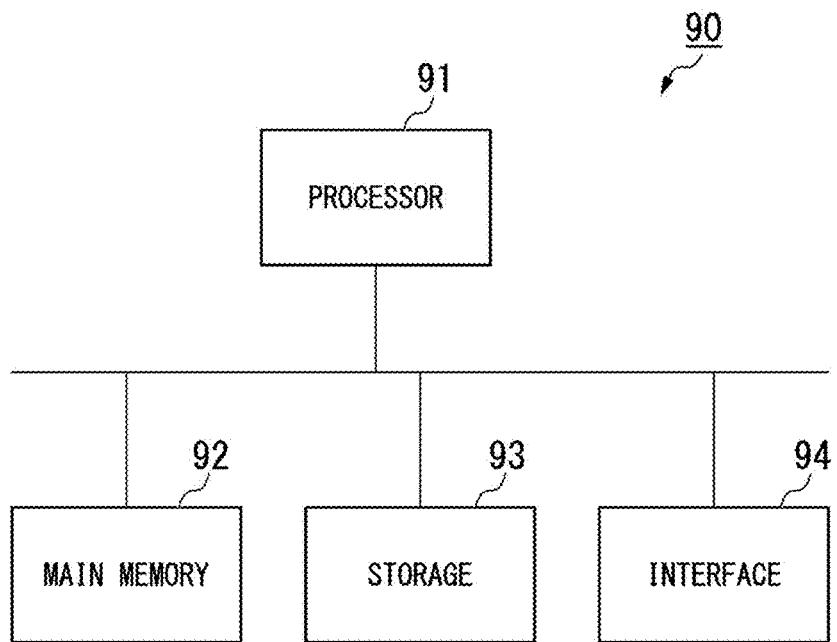
FIG. 7 is a schematic block diagram showing the configuration of a computer according to at least one embodiment.

FIG. 7 is a schematic block diagram showing the configuration of a computer according to at least one embodiment.

A computer 90 includes a processor 91, a main memory 92, a storage 93, and an interface 94.

The management device 50 and the control device 163 described above are each implemented on the computer 90. Then, an operation of each of the above-described processing units is stored in the storage 93 in a form of a program. The processor 91 reads out the program from the storage 93, loads the program in the main memory 92, and executes the above-mentioned processing according to the program. Further, the processor 91 secures storage areas corresponding to the above-described processing units, in the main memory 92 according to the program. Examples of the processor 91 include a central processing unit (CPU), a graphic processing unit (GPU), and a microprocessor.

The program may be used to implement some of functions that the computer 90 is caused to exhibit. For example, the program may exhibit the functions in combination with another program that has already been stored in the storage 93 or in combination with another program installed in another device. In another embodiment, the computer 90 may include a custom large scale integrated circuit (LSI), such as a programmable logic device (PLD) in addition to or instead of the above-mentioned configuration. Examples of the PLD include a programmable array logic (PAL), a generic array logic (GAL), a complex programmable logic device (CPLD), and a field programmable gate array (FPGA). In this case, some or all of the functions implemented by the processor 91 may be implemented by the integrated circuit. Such an integrated circuit is also included as an example of the processor.

Examples of the storage 93 include a magnetic disk, a magneto-optical disk, an optical disk, and a semiconductor memory. The storage 93 may be an internal medium that is directly connected to a bus of the computer 90 or an external medium that is connected to the computer 90 through the interface 94 or a communication line. Further, in a case where this program is distributed to the computer 90 through the communication line, the computer 90 that has received the distributed program may load the program in the main memory 92 to execute the above-mentioned processing. In at least one embodiment, the storage 93 is a non-transitory tangible storage medium.

In addition, the program may be used to implement some of the above-described functions. In addition, the program may be a so-called difference file (difference program) that implements the above-mentioned functions in combination with another program that has already been stored in the storage 93.

INDUSTRIAL APPLICABILITY

A management device of a work vehicle can manage traveling of the work vehicle provided with a fuel cell and a battery at a work site.

REFERENCE SIGNS LIST

1: Transport system
10: Transport vehicle
11: Dump body
12: Vehicle body
13: Traveling device
14: Power system
141: Hydrogen tank
142: Hydrogen supply device
143: Fuel cell
144: Battery
145: DCDC converter
146: Retarder grid
15: Drive system
151: Inverter
152: Pump drive motor
153: Hydraulic pump
154: Hoist cylinder
155: Inverter
156: Traveling drive motor
16: Control system
161: Measurement device
162: Communication device
163: Control device
164: Operation device
165: Monitor
171: Data acquisition unit
172: Vehicle body control unit
173: Fuel cell control unit
174: Required electric power calculation unit
175: Battery control unit
176: Display control unit
30: Loading machine
50: Management device
51: Measurement value acquisition unit
52: Mine state specifying unit
53: Route generation unit
54: Terrain data storage unit
55: Traveling load calculation unit
56: Electric power amount calculation unit
57: Route selection unit
58: Instruction unit
90: Computer
91: Processor
92: Main memory
93: Storage
94: Interface
B: Bus
C: Course
P1: Mining field
P2: Earth disposal field
P3: Standby field
S: Hydrogen station

The invention claimed is:

1. A management device for a work vehicle provided with a fuel cell and a battery, the management device comprising:
an electric power amount calculation unit configured to calculate, based on a travel route of the work vehicle at a work site and generated electric power from the fuel cell, a required electric power amount of the battery for traveling on the travel route; and
an instruction unit configured to instruct, in a case where a remaining capacity of the battery falls below the required electric power amount, the work vehicle to stand by until the remaining capacity of the battery is charged to be equal to or more than the required electric power amount by the generated electric power of the fuel cell.

2. The management device according to claim 1, wherein the instruction unit instructs, in a case where the remaining capacity of the battery is equal to or more than the required electric power amount, the work vehicle to travel on the travel route.

3. The management device according to claim 1, wherein the electric power amount calculation unit calculates the required electric power amount of the battery for traveling on the travel route based on a load required for traveling on the travel route and the generated electric power from the fuel cell.

4. The management device according to claim 1, further comprising:
a route generation unit configured to generate the travel route of the work vehicle at the work site.

5. The management device according to claim 4, wherein
the route generation unit generates a plurality of travel routes including the travel route,
the electric power amount calculation unit calculates required electric power amounts for the plurality of travel routes, and
the instruction unit
instructs, in a case where the remaining capacity of the battery is equal to or more than a predetermined reference lower limit value, the work vehicle to travel on any one of the plurality of travel routes, and
instructs, in a case where the remaining capacity of the battery falls below the reference lower limit value and the remaining capacity of the battery is equal to or more than a smallest required electric power amount among the required electric power amounts related to the plurality of travel routes, the work vehicle to travel on a travel route related to the smallest required electric power amount.

6. The management device according to claim 4, wherein
the route generation unit generates a plurality of travel routes including the travel route,
the electric power amount calculation unit calculates required electric power amounts for the plurality of travel routes, and
the instruction unit
instructs, in a case where the remaining capacity of the battery is equal to or less than a predetermined reference upper limit value, the work vehicle to travel on any one of the plurality of travel routes, and
instructs, in a case where the remaining capacity of the battery exceeds the reference upper limit value, the work vehicle to travel on a travel route having a largest required electric power amount among the plurality of travel routes.

7. The management device according to claim 1, wherein the instruction unit
instructs, in a case where a remaining amount of hydrogen gas loaded on the work vehicle falls below a predetermined replenishment threshold value, the work vehicle to replenish the hydrogen gas, and
instructs, in a case where the remaining amount of the hydrogen gas is equal to or more than the replenishment threshold value and the remaining capacity of the battery is equal to or more than the required electric power amount, the work vehicle to travel on the travel route.

8. A management method for a work vehicle provided with a fuel cell and a battery, the management method comprising:
a step of calculating, based on a travel route of the work vehicle at a work site and generated electric power from the fuel cell, a required electric power amount of the battery for traveling on the travel route; and
a step of instructing, in a case where a remaining capacity of the battery falls below the required electric power amount, the work vehicle to stand by until the remaining capacity of the battery is charged to be equal to or more than the required electric power amount by the generated electric power of the fuel cell.

9. The management method according to claim 8, further comprising:
a step of instructing, in a case where the remaining capacity of the battery is equal to or more than the required electric power amount, the work vehicle to travel on the travel route.

10. The management method according to claim 8, wherein
in the step of calculating the required electric power amount, the required electric power amount of the battery for traveling on the travel route is calculated based on a load required for traveling on the travel route and the generated electric power from the fuel cell.

11. The management method according to claim 8, further comprising:
a step of generating the travel route of the work vehicle at the work site.

12. The management method according to claim 11, wherein
in the step of generating the travel route, a plurality of travel routes including the travel route are generated,
in the step of calculating the required electric power amount, required electric power amounts for the plurality of travel routes are calculated,
in the step of instructing to travel, the work vehicle is instructed, in a case where the remaining capacity of the battery is equal to or more than a predetermined reference lower limit value, to travel on any one of the plurality of travel routes, and
in the step of instructing to travel, the work vehicle is instructed, in a case where the remaining capacity of the battery falls below the reference lower limit value and the remaining capacity of the battery is equal to or more than a smallest required electric power amount among the required electric power amounts related to the plurality of travel routes, to travel on a travel route related to the smallest required electric power amount.

13. The management method according to claim 11, wherein
in the step of generating the travel route, a plurality of travel routes including the travel route are generated,
in the step of calculating the required electric power amount, required electric power amounts for the plurality of travel routes are calculated,
in the step of instructing to travel, the work vehicle is instructed, in a case where the remaining capacity of the battery is equal to or less than a predetermined reference upper limit value, to travel on any one of the plurality of travel routes, and
in the step of instructing to travel, the work vehicle is instructed, in a case where the remaining capacity of the battery exceeds the reference upper limit value, to travel on a travel route having a largest required electric power amount among the plurality of travel routes.

14. The management method according to claim 11, further comprising:
a step of instructing, in a case where a remaining amount of hydrogen gas loaded on the work vehicle falls below a predetermined replenishment threshold value, the work vehicle to replenish the hydrogen gas, wherein in the step of instructing to travel, the work vehicle is instructed, in a case where the remaining amount of the hydrogen gas is equal to or more than the replenishment threshold value and the remaining capacity of the battery is equal to or more than the required electric power amount, to travel on the travel route.

15. The management device according to claim 2, wherein the electric power amount calculation unit calculates the required electric power amount of the battery for traveling on the travel route based on a load required for traveling on the travel route and the generated electric power from the fuel cell.

16. The management device according to claim 2, further comprising:

a route generation unit configured to generate the travel route of the work vehicle at the work site.

17. The management device according to claim 5, wherein the route generation unit generates a plurality of travel routes including the travel route, the electric power amount calculation unit calculates required electric power amounts for the plurality of travel routes, and the instruction unit instructs, in a case where the remaining capacity of the battery is equal to or less than a predetermined reference upper limit value, the work vehicle to travel on any one of the plurality of travel routes, and instructs, in a case where the remaining capacity of the battery exceeds the reference upper limit value, the work vehicle to travel on a travel route having a largest required electric power amount among the plurality of travel routes.

18. The management device according to claim 2, wherein the instruction unit instructs, in a case where a remaining amount of hydrogen gas loaded on the work vehicle falls below a predetermined replenishment threshold value, the work vehicle to replenish the hydrogen gas, and instructs, in a case where the remaining amount of the hydrogen gas is equal to or more than the replenishment threshold value and the remaining capacity of the battery is equal to or more than the required electric power amount, the work vehicle to travel on the travel route.

19. The management method according to claim 9, wherein in the step of calculating the required electric power amount, the required electric power amount of the battery for traveling on the travel route is calculated based on a load required for traveling on the travel route and the generated electric power from the fuel cell.

20. The management method according to claim 9, further comprising:

a step of generating the travel route of the work vehicle at the work site.

* * * * *